United States Patent
Shaw

(10) Patent No.: US 11,619,231 B1
(45) Date of Patent: Apr. 4, 2023

(54) COMPLETE BEARING-SEALED ROOT VACUUM PUMP SYSTEM CAPABLE OF PROMOTING VACUUM ABILITY OF CONDENSER OF POWER PLANT

(71) Applicant: Raymond Zhou Shaw, Salisbury, MD (US)

(72) Inventor: Raymond Zhou Shaw, Salisbury, MD (US)

(73) Assignees: ELVAC CO., LTD, Shanghai (CN); Raymond Z. Shaw; ELVAC INC., Salisbury, MD (US)

( * ) Notice: Subject to any disclaimer, the term of this patent is extended or adjusted under 35 U.S.C. 154(b) by 0 days.

(21) Appl. No.: 17/563,070

(22) Filed: Dec. 28, 2021

(51) Int. Cl.
| | |
|---|---|
| F04C 23/00 | (2006.01) |
| F04C 18/12 | (2006.01) |
| F04C 25/02 | (2006.01) |
| F01K 9/00 | (2006.01) |
| F01K 9/02 | (2006.01) |
| F04C 29/04 | (2006.01) |

(52) U.S. Cl.
CPC ............ *F04C 23/001* (2013.01); *F01K 9/003* (2013.01); *F01K 9/023* (2013.01); *F04C 18/126* (2013.01); *F04C 25/02* (2013.01); *F04C 29/04* (2013.01); *F04C 2220/10* (2013.01)

(58) Field of Classification Search
CPC .......... F04C 18/126; F04C 23/001–003; F04C 25/02; F01K 9/003; F01K 9/023
See application file for complete search history.

(56) References Cited

U.S. PATENT DOCUMENTS 3,642,384 A * 2/1972 Huse ................. F04C 19/00
                                            417/69
5,595,477 A * 1/1997 Amlinger ............ F04D 25/16
                                       417/205

FOREIGN PATENT DOCUMENTS

CN         204574855 U * 8/2015
EP          2949938 B1 * 10/2018 ............ F04C 18/126

* cited by examiner

*Primary Examiner* — Alexander B Comley

(57) ABSTRACT

A complete bearing-sealed root vacuum pump system capable of promoting vacuum ability of a condenser of a power plant provides a complete bearing-sealed structure. All chambers are isolated effectively so that liquid cannot flow there between and thus not to destroy the root vacuum pump. Therefore, the lifetime of the root vacuum pump is prolonged. The heat exchangers are arranged between the root vacuum pumps and the front stage pump so as to return the condensed water. The condenser vacuum is improved and thus the power generation efficiency is promoted, and power consumption is lowered. As a result a large power plant can save several thousand tons of coals per year.

11 Claims, 3 Drawing Sheets

COMPLETE BEARING-SEALED ROOT VACUUM PUMP SYSTEM CAPABLE OF PROMOTING VACUUM ABILITY OF CONDENSER OF POWER PLANT

The invention is a continuation in part (CIP) of the U.S. patent application Ser. No. 16/831,834 filed at Mar. 27, 2020 and application Ser. No. 17/400,141 filed at Aug. 12, 2021, which are assigned to the inventor of the present invention, and thus the contents of the U.S. patent application Ser. Nos. 16/831,834 and 17/400,141 are incorporated into the present invention as a part of the specification.

FIELD OF THE INVENTION

The present invention relates to improvement of root vacuum pump system, and in particular to a complete bearing-sealed root vacuum pump system capable of promoting vacuum ability of a condenser of a power plant.

BACKGROUND OF THE INVENTION

In prior thermal power plants, gas condensers for turbine-generator sets are operated under vacuum state. One of the primary functions of the gas condenser is to assure that the power generator is in vacuum. The vacuum state of the condenser directly affects power efficiency of coat or gas in turbine generator sets. Currently, general used vacuuming systems of condensers of thermal power plants are large scale water circulation vacuum pumps, vapor vacuuming systems or water jet vacuuming systems.

However, for vacuuming systems used in most power plants, large scale water circulation pumps operate in predetermined frequencies extreme vacuums of which are limited by water temperatures and saturated vapor pressures so that the vacuum level cannot be promoted effectively and coal consumption cannot be down. Furthermore, in high temperatures, air etching is easy to generate in large scale water circulation vacuum pumps which results that the vacuuming ability is down.

Besides, although in resent, there are many condensed used vacuum machines some of which adapt root pumps, the vacuum abilities of these vacuuming machines bring limited and power saving efficiency being low so that the vacuuming states of the condensers are not improved. Furthermore, outputs of the condensers include gases which has large amounts of saturated vapors which are harmful to internal structures of the root pumps. Although some vacuum machines adapt piston pumps with water circulation pump for enhancing the ability to tolerate pressure differences, these systems are not applicable to power planet condenser systems with large air emission and containing water.

SUMMARY OF THE INVENTION

Accordingly, for improving above mentioned defects in the prior art, the object of the present invention is to provide complete bearing-sealed root vacuum pump system capable of promoting vacuum ability of a condenser of a power plant, wherein advantages of the present invention are that by the structure of the present invention, a one or multi-stage complete sealing root vacuum pump capable of tolerating high pressure difference and high temperatures can greatly enhance the vacuum ability of the front stage pump. Therefore, the pump ability of vacuum system of an air condenser is promoted effectively. In the present invention, by the complete bearing-sealed structure, all chambers are isolated effectively as a result liquid and impurity cannot flow therebetween so as not to destroy the root vacuum pump. Therefore, the lifetime of the root vacuum pump is prolonged. In the present invention, heat exchangers are arranged between the root vacuum pumps and the front stage pump so as to return the condensed water. The present invention has improved the vacuuming system of the condenser with a lower cost and great efficiency. In the present invention, the condenser vacuum is improved so that the power generation efficiency is promoted, and power consumption is lowered. As a result a large power plant can save several thousand tones of coals per year.

A complete bearing-sealed root vacuum pump system capable of promoting vacuum ability of a condenser of a power plant, where the condenser includes a vacuum primary tube, comprising:

at least one valve installed on the vacuum primary tube for preventing air permeating into the condenser;

a front stage pump including an air inlet and an air outlet; the air inlet of the front stage pump being connected to an air input tube;

a root vacuum pump set including at least one root vacuum pump; the root vacuum pump set including an input end connected to the vacuum primary tube and an output end connected to the front stage pump; vapor from the vacuum primary tube inputting to the at least one root vacuum pump from the input end of the root vacuum pump set and being processed therein, and then being outputted from the output end of the root vacuum pump set;

each of the root vacuum pump including a casing which having an inlet and an outlet; internal of the casing being formed with a vacuum chamber and two bearing chambers at two sides of the vacuum chamber; the vacuum chamber being connected to the inlet and the outlet; a driving shaft being installed within the casing and penetrating through the vacuum chamber and two bearing chambers; one end of the driving shaft extruding out of a lateral wall of the casing; internal of the vacuum chamber including blades which is installed on the driving shaft; mixed gas inputted externally entering into the vacuum chamber and being then compressed by rotation of the blades; two inner lateral walls between the two bearing chambers and the vacuum chamber and the outer lateral walls of the casing being installed with bearings, the driving shaft penetrating through the bearings and being supported by the bearings; the bearings completely sealing spaces between the driving shaft and the two inner lateral walls and the outer lateral walls so that vacuum chamber and the two bearing chambers being isolated completely; as a result, liquid outside the casing and within the two vacuum chambers cannot, permeate into the vacuum chamber, and the mixed gas within the vacuum chamber cannot vent into the two bearing chambers; therefore, in operation, only original gas and inputted mixed gas are within the vacuum chamber of the root vacuum pump; furthermore liquid within the bearing chambers does not drain out of the casing; and wherein as the at least one root vacuum pump only includes one root vacuum pump, the inlet of the root vacuum pump is connected to an input end of the root vacuum pump set and an outlet of the root vacuum pump is connected to the output end of the root vacuum pump set; wherein the at least one root vacuum pump is a plurality of root vacuum pumps; the root vacuum pumps are serially connected one by one; and the inlet of a last one of the plurality of root vacuum pumps is connected the output end of the root vacuum pump set; and a transfer tube is connected between an inlet and an outlet of two adjacent root vacuum pumps.

DETAILED DESCRIPTION OF THE INVENTION

Figure 1:
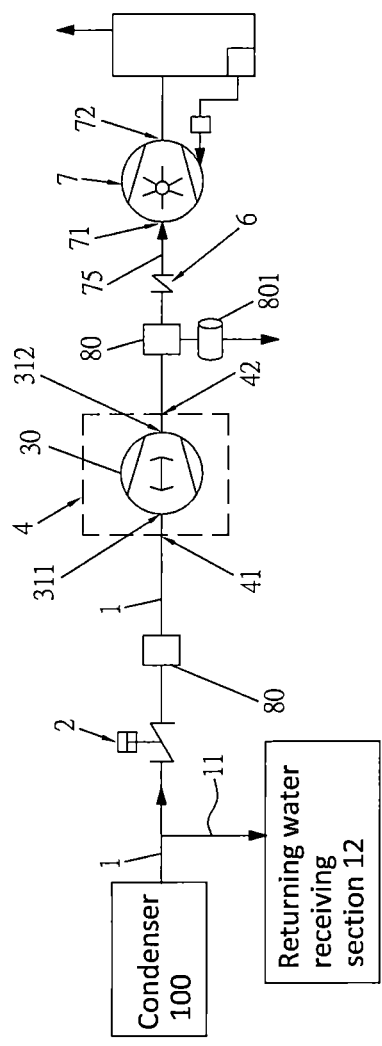
FIG. 1 is an assembled schematic view showing the elements of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 5, the structure of the present invention is illustrated. The present invention is installed at a rear end of a condenser 100. The condenser 100 includes a vacuum primary tube 1. The completely bearing-sealed root vacuum pump system of the present invention comprises the following elements.

At least one valve 2 is installed on the vacuum primary tube 1. The valve 2 includes an auto valve sheet (not shown) (such as an air driving valve sheet or an electromotive valve sheet) for sealing the primary tube 1 when the system is shutdown to prevent air from venting out. The valve 2 further includes a manual valve sheet (not shown) as a backup of the auto valve sheet. A returning tube 11 is installed at a front side of the valve 2 and is connected between the vacuum primary tube 1 and a returning water receiving section 12 for receiving returning water to prevent condensed vapor from flowing to the vacuum pump.

A front stage pump 7 includes an air inlet 71 and an air outlet 72. The air inlet 71 of the front stage pump 7 is connected to an air input tube 75. The front stage pump 7 may be a water circulation vacuum pump (such as a big water circulation vacuum pump in a power plant, or other small water circulation vacuum pump in other power saving vacuum machine), or non water circulated front stage pump which drains air to outer side.

A root vacuum pump set 4 includes at least one root vacuum pump 30. The root vacuum pump set 4 includes an input end 41 connected to the vacuum primary tube 1 and an output end 42 connected to the front stage pump 7. Vapor from the vacuum primary tube 1 inputs to the at least one root vacuum pump 30 from the input end 41 of the root vacuum pump set 4 and is processed therein, and then is outputted from the output end 42 of the root vacuum pump set 4. Preferably, the at least one root vacuum pump 30 includes one, two or three root vacuum pumps 30.

Each of the root vacuum pump 30 includes a casing 31 which has an inlet 311 and an outlet 312. Internal of the casing 31 is formed with a vacuum chamber 32 and two bearing chambers 33 at two sides of the vacuum chamber 32. The vacuum chamber 32 is connected to the inlet 311 and the outlet 312. A driving shaft 34 is installed within the casing 31 and penetrates through the vacuum chamber 32 and two bearing chambers 33. One end of the driving shaft 34 extrudes out of a lateral wall 315 of the casing 31. Internal of the vacuum chamber 32 includes blades 35 which is installed on the driving shaft 34. Mixed gas inputted externally enters into the vacuum chamber 32 and is then compressed by rotation of the blades 35. Two inner lateral walls 313, 314 between the two bearing chambers 33 and the vacuum chamber 32 and the outer lateral walls 315 of the casing 31 are installed with bearings 36, the driving shaft 34 penetrates through these bearings 36 and is supported by these bearings 36. The bearings 36 completely seal spaces between the driving shaft 34 and the two inner lateral walls 313, 314 and the outer lateral walls 315 so that vacuum chamber 32 and the two bearing chambers 33 are isolated completely. As a result, liquid outside the casing 31 and within the two bearing chambers 33 cannot permeate into (flow into) the vacuum chamber 32, as well as the mixed gas within the vacuum chamber 32 cannot vent into the two bearing chambers 33. Therefore, in operation, only original gas and inputted mixed gas are within the vacuum chamber 32 of the root vacuum pump 30, no other impurity flowing thereto. Furthermore liquid, such as lube oil, within the bearing chambers 33 does not drain out of the casing 31.

In the present invention, the structure of the root vacuum pumps 30 can suffer from great pressure, so call great pressure is that when the condenser is retained in a vacuum state, the root vacuum pumps 30 can be operated all day lone under an inlet pressure of 5000 Pa (Pascal) to 30000 Pa, and can tolerate with a pressure difference of 5000 Pa to 10000 Pa, while the prior art root vacuum pump cannot tolerate these states.

The root vacuum pump 30 can tolerate high temperature, so called high temperature means one about 150° C., i. e., gas temperature in the vacuum chamber 32 of the root vacuum pump 30 may be as high as 150° C.

The root vacuum pump 30 of the present invention has a complete sealing structure instead of semi-sealing structure. As a result, in the present invention, the vacuum chamber 32, bearing chambers 33 and related driving mechanisms (such as gears) are completely isolated from liquid for preventing problems of emulsion or draining or vapors. Therefore, the root vacuum pumps 30 of the present invention are not water cooling root vacuum pumps, piston pumps, compressors, common used labyrinth or piston ring half-opened bearing sealing root pumps (inlet pressures of these kinds of pumps have inlet pressures small than 1000 Pa and pressure differences smaller than 5000 Pa with an operation temperature smaller than 80° C.

As illustrated in FIG. 1, as the at least one root vacuum pump 30 only includes one root vacuum pump 30, the inlet 311 of the root vacuum pump 30 is connected to an input end 41 of the root vacuum pump set 4 and an outlet of the root vacuum pump 30 is connected to the output end 42 of the root vacuum pump set 4.

Figure 2:
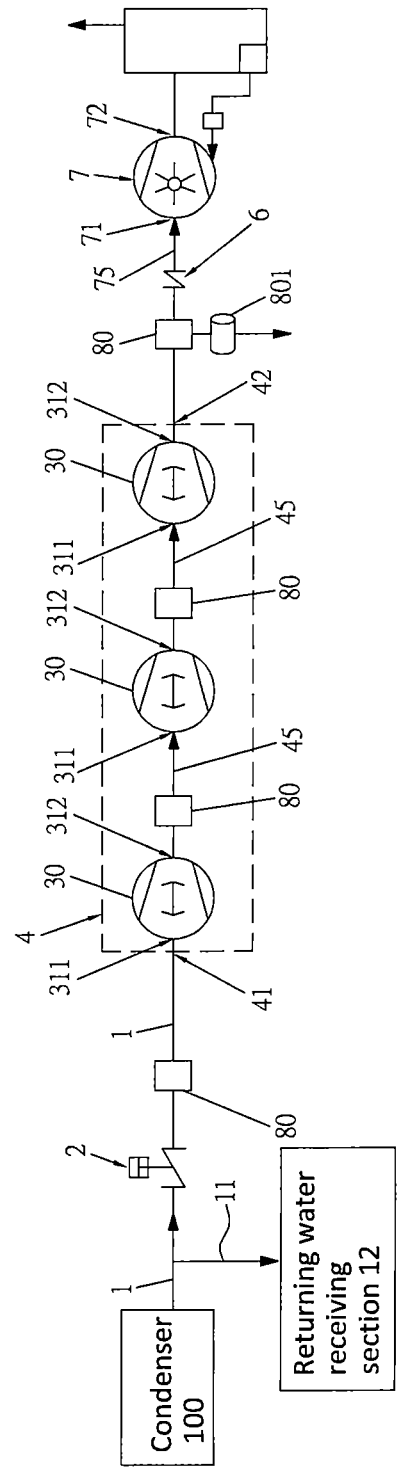
FIG. 2 is another assembled schematic view showing the elements of the present invention.

With reference of FIG. 2, when the root vacuum pump set 4 includes a plurality of root vacuum pumps 30, these root vacuum pumps 30 being serially connected. The inlet 311 of the foremost root vacuum pump 30 is connected to the output end 42 of the root vacuum pump set 4, while inlet 311 and outlet 312 of two adjacent root vacuum pumps 30 are connected by a transfer pipe 45. Therefore, pressure difference is distributed between these root vacuum pumps 30, as a result, thermal power generated in compression of air being distributed between these root vacuum pumps 30. Thus, no root vacuum pump 30 is deadly buckled due to overheating, the present invention assuring steady operation.

A plurality of coolers 80 are arranged on at least one of the transfer tube 45, the air input tube 75, or the vacuum primary tube 1 for preventing the compression air from the front stage to be overheated to affect safety operation of the vacuum pump in the following stage.

At least one of the coolers 80 includes a first cooling liquid returning unit 801 for draining and returning cooling water from compression saturated vapor of the cooler 80. Since the object of the vacuum system of the present invention is aimed to promote vacuum of a power plant, the system of the present invention has more powerful air pumping ability, more higher compression ratios, and more higher pressure difference between different stages than normal vacuum retaining systems. After compressing by various root vacuum pumps 30, the present invention can get more condensed water than normal vacuum retaining systems with more saturated vapor (with quantity as greater as two times of the normal saturated vapor generated). The first cooling liquid returning unit 801 serves to return these condensed water (which is expensive soft water) so that this condensed water may be drained and returned in time in operation, assuring the smooth operation of the pipe lines and reducing the loads applied to the succeeding root vacuum pumps 30, while system vacuum is not destroyed.

Figure 5:
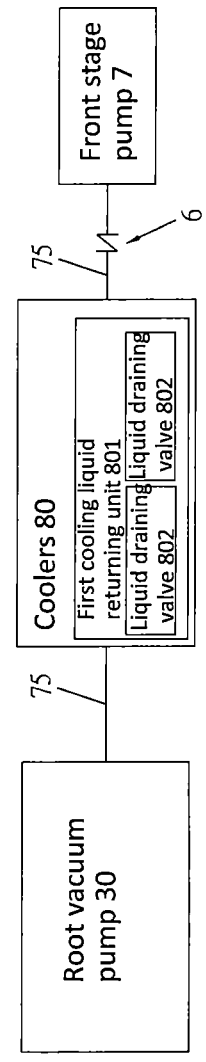
FIG. 5 is a block diagram showing that a cooler is connected between a last root vacuum pump and a front stage pump 7.

With reference to FIG. 5, preferably, the air input tube 75 is arranged with a cooler 80 which includes a respective first cooling liquid returning unit 801.

The first cooling liquid returning unit 801 further includes at least one liquid draining valve 802 for controlling draining of condensed water. Preferably, the first cooling liquid returning unit 801 may include two liquid draining valves 802 which are electrically controlled.

The air input tube 75 is arranged with a check valve 6 for avoiding that air fills into the root vacuum pumps 30 and the condenser 100 from the vacuum pumping system as the system is tripped or other abruption occurs.

Substantially, the front stage pump 7 may be water circulation pumps, or liquid circulation pumps in the air condensing vacuum sustaining system of current power plants, or the front stage pump 7 may adapt a complete bearing-sealed root vacuum pump system, which may accomplish the goals of high vacuum, saving of coals, and reduction of electrical power.

Figure 3:
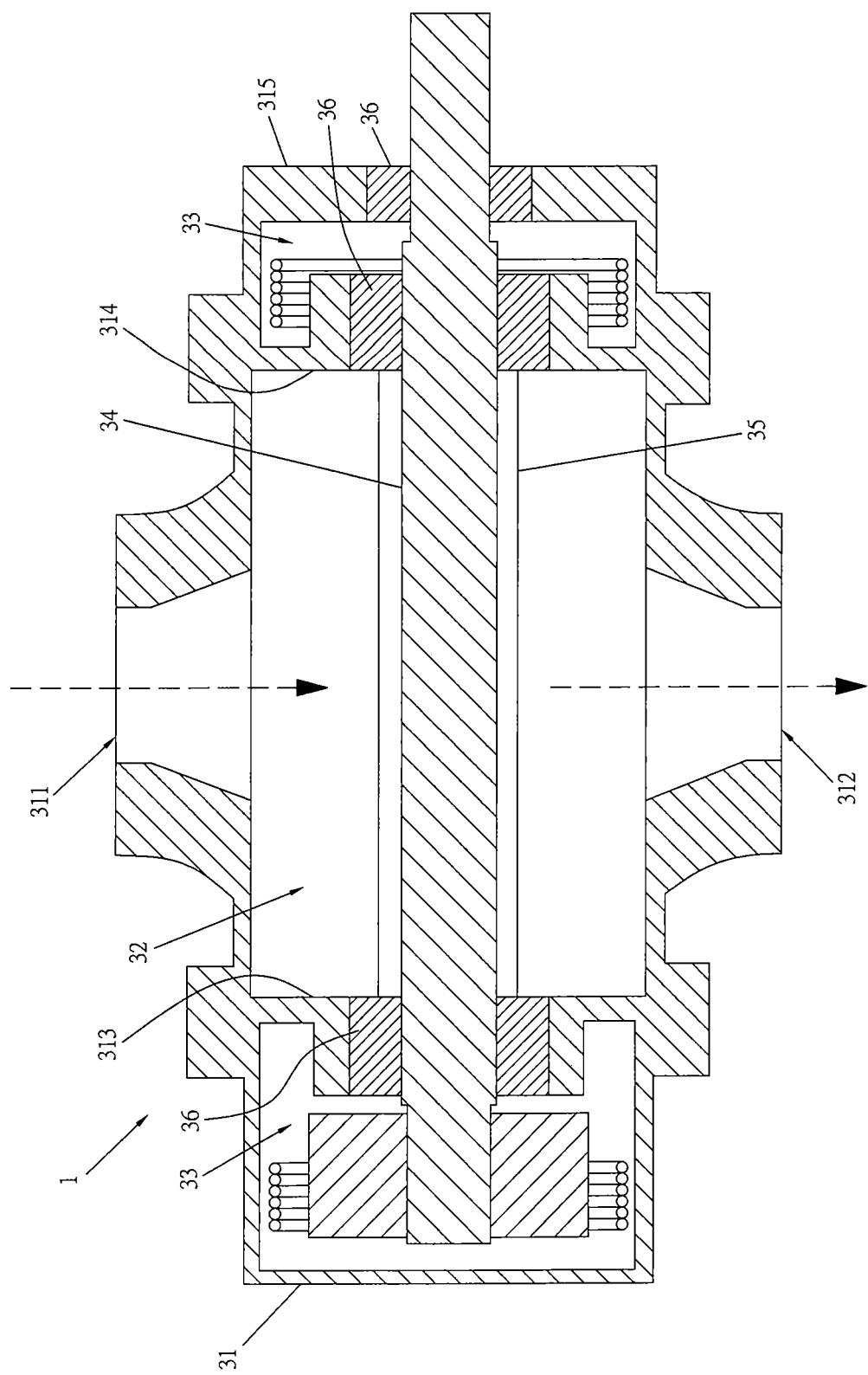
FIG. 3 shows a cross sectional schematic view of a root vacuum pump according to the present invention.

Each root vacuum pump 30 may be a two blade or three blade root vacuum pump, or air cooling root vacuum pump, FIG. 3 showing the cross section view of this root vacuum pump 30, in that the bearing 36 is completely isolated from the bearing chamber 33. Prior root vacuum pump adapts semi-sealing technology of labyrinth or piston ring half-opened bearing sealing, which does not seal the space between the vacuum chamber 32 and the bearing chamber 33. The present invention uses mechanic sealing or ceramic sealing. Besides, the casing 31, outlet 312 and blades 35 must be specially designed, manufactured and tested so that the inlet pressures of the root vacuum pump 30 are far greater than inlet pressure of the general root pump. Furthermore the pressure difference between inlet and outlet does not make the root vacuum pump 30 thermally expand or deform so as to deadly buckle.

When there are a plurality of root vacuum pumps 30, the vacuum primary tube 1 is arranged with a three way tube, one more added vacuum tube is connected to the inlet 311 of the main root vacuum pump 3. When there is only one root vacuum pump 30, the vacuum tubes (not shown) to the inlet of a large water circulation pump (that is, the front stage pump 7) to the current power plant must be changed so that the root vacuum pump 30 has sufficient space for installation.

Figure 4:
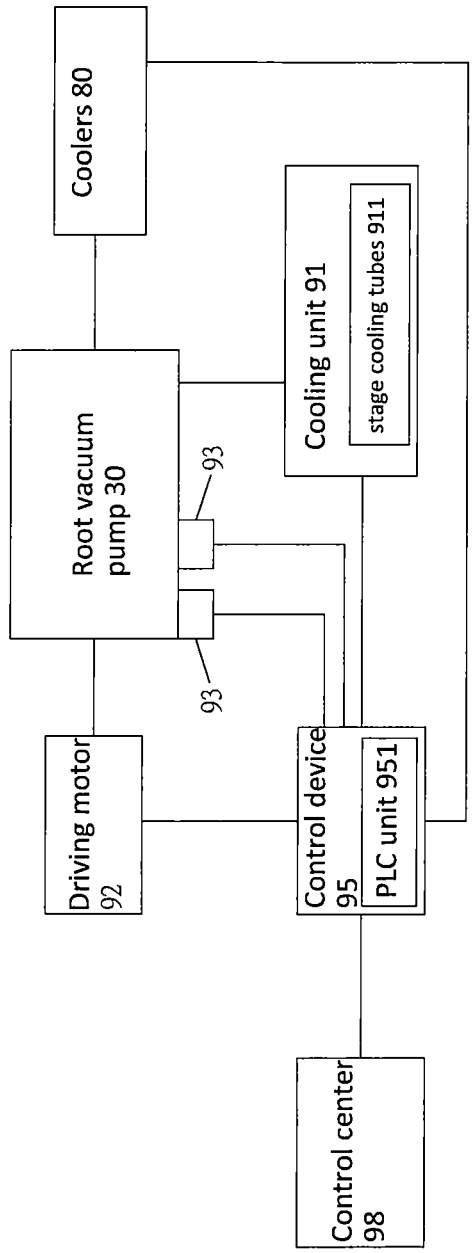
FIG. 4 is a block diagram showing the related electric elements and control circuit of the root vacuum pump of the present invention.

The element of each root vacuum pump 30 is shown in FIG. 4. The root vacuum pump 30 is connected to a driving motor 92 for driving the root vacuum pump 30 which is further connected to a cooling unit 91 for cooling water inputting to the root vacuum pump 30. The cooling device 91 further comprises a stage cooling tubes 911 so as to reduce temperatures of draining air and the root vacuum pump 30.

The root vacuum pump 30 is further arranged with at least one transducer 93 for sensing operation of the root vacuum pump 30. The transducer 93 is one of a rotation sensor, a current sensor, a temperature sensor or an inlet pressure transducer of a vacuum pump. The at least one transducer 93 is connected to a control unit 95. The control unit 95 includes a PLC unit 951 (programmable logic control) for proceeding relative control operation. The control unit 95 is connected to the driving unit 93 and the cooling unit 91. The control unit 95 receives detection data from the transducer 93 and frequency varied controls each of the driving motor 92, and opening of the valves 2, 6 and liquid draining valve 802 according to preset operation logics for achieving the goal of in-time control, assuring the system safety and high efficiency operation. The data of the control unit 95 may be transferred to a far end control center 98, where a DCS (distributed control system) structure is used to unified monitor.

The control device 95 controls the driving motor 92 to control the root vacuum pump 30 by variation of frequencies, which is suitable for the variation of the condenser 100. When the condenser 100 is in a good condition, the root vacuum pump 30 is operated in lower frequency. When the condenser 100 is not in good condition, the root vacuum pump 30 is operated in high frequency.

Advantages of the present invention are that by the structure of the present invention, a one or multi-stage complete sealing root vacuum pump capable of tolerating high pressure difference and high temperatures can greatly enhance the vacuum ability of the front stage pump. Therefore, the pump ability of vacuum system of an air condenser is promoted effectively. In the present invention, by the complete bearing-sealed structure, all chambers are isolated effectively as a result liquid and impurities cannot flow therebetween so as not to destroy the root vacuum pump. Therefore, the lifetime of the root vacuum pump is prolonged. In the present invention, heat exchangers are arranged between the root vacuum pumps and the front stage pump so as to return the condensed water. The present invention has improved the vacuuming system of the condenser with a lower cost and great efficiency. In the present invention, the condenser vacuum is improved so that the power generation efficiency is promoted, and power consumption is lowered. As a result a large power plant can save several thousand tones of coals per year.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A complete bearing-sealed root vacuum pump system capable of promoting vacuum ability of a condenser of a power plant, where the condenser includes a vacuum primary tube, comprising: at least one valve installed on the vacuum primary tube for preventing air from permeating into the condenser; a front stage pump including an air inlet and an air outlet; the air inlet of the front stage pump being connected to an air input tube; a root vacuum pump set including at least one root vacuum pump; the root vacuum pump set including an input end connected to the vacuum primary tube and an output end connected to the front stage pump; vapor from the vacuum primary tube inputting to the at least one root vacuum pump from the input end of the root vacuum pump set and being processed therein, and then being outputted from the output end of the root vacuum pump set; each of the at least one root vacuum pump including a casing having an inlet and an outlet, an interior of the casing being formed with a vacuum chamber and two bearing chambers at two sides of the vacuum chamber; the vacuum chamber being connected to the inlet and the outlet; a driving shaft being installed within the casing and penetrating through the vacuum chamber and the two bearing chambers; one end of the driving shaft extending out of a lateral wall of the casing; the vacuum chamber including blades therein which are installed on the driving shaft; mixed gas is input into the vacuum chamber and is then compressed by rotation of the blades; two inner lateral walls between the two bearing chambers and the vacuum chamber and the an outer lateral wall of the casing each being installed with a respective bearing, the driving shaft penetrating through the bearings and being supported by the bearings; the bearings completely sealing spaces between the driving shaft and the two inner lateral walls and the outer lateral wall so that the vacuum chamber and the two bearing chambers are isolated completely; wherein liquid outside the casing and within the two bearing chambers cannot permeate into the vacuum chamber, and the mixed gas within the vacuum chamber cannot vent into the two bearing chambers; wherein in operation, only the vapor and the mixed gas enter the vacuum chamber of the at least one root vacuum pump; and liquid within the bearing chambers does not drain out of the casing; a plurality of coolers which are arranged on at least one of the transfer tube, the air input tube, or the vacuum primary tube; wherein one of the coolers includes a first cooling liquid returning unit for draining and returning cooling water from compressed saturated vapor of the cooler; the first cooling liquid returning unit further includes at least one liquid draining valve for controlling drainage of the cooling water; and wherein the at least one root vacuum pump is connected to a driving motor for driving the at least one root vacuum pump and is further connected to a cooling unit for cooling water input to the at least one root vacuum pump; the cooling unit further comprises stage cooling tubes to reduce a temperature of the at least one root vacuum pump; the at least one root vacuum pump is further arranged with at least one transducer for sensing operation of the at least one root vacuum pump; the at least one transducer is one of a rotation sensor, a current sensor, a temperature sensor or an inlet pressure transducer; the at least one transducer is connected to a control unit; the control unit includes a PLC unit for performing control operation; the control unit is connected to the driving motor and the cooling unit; the control unit receives detection data from the at least one transducer and controls each of the driving motor, the opening of the valve, and the liquid draining valve according to preset operation logics, thereby assuring system safety and high efficiency operation; the detection data being transferred to a far end control center.

2. The complete bearing-sealed root vacuum pump system capable of promoting vacuum ability of a condenser of a power plant as claimed in claim 1, wherein a structure of each of the at least one root vacuum pump is tolerable to great pressure, wherein great pressure is that when the condenser is retained in a vacuum state, the at least one root vacuum pump is capable of being operated all day long under an inlet pressure of 5000 Pa to 30000 Pa, and is tolerable to a pressure difference of 5000 Pa to 10000 Pa.

3. The complete bearing-sealed root vacuum pump system capable of promoting vacuum ability of a condenser of a power plant as claimed in claim 1, wherein an operation temperature of the at least one root vacuum pump is 150° C.

4. The complete bearing-sealed root vacuum pump system capable of promoting vacuum ability of a condenser of a power plant as claimed in claim 1, wherein the at least one root vacuum pump is one, two or three root vacuum pumps.

5. The complete bearing-sealed root vacuum pump system capable of promoting vacuum ability of a condenser of a power plant as claimed in claim 1, wherein the air input tube is arranged with a cooler which includes the first cooling liquid returning unit.

6. The complete bearing-sealed root vacuum pump system capable of promoting vacuum ability of a condenser of a power plant as claimed in claim 1, wherein the air input tube is arranged with a check valve configured to prevent air from flowing back into the at least one root vacuum pump and the condenser from the vacuum pumping system when the system is tripped or other abruption occurs.

7. The complete bearing-sealed root vacuum pump system capable of promoting vacuum ability of a condenser of a power plant as claimed in claim 1, wherein the at least one valve is one of air-driving valves, electromotive valves, and manual valves; a returning tube is installed at a front side of the at least one valve and is connected between the vacuum primary tube and a section for receiving returning water to prevent condensed vapor from flowing to the root vacuum pump set.

8. The complete bearing-sealed root vacuum pump system capable of promoting vacuum ability of a condenser of a power plant as claimed in claim 1, wherein each root vacuum pump of the at least one root vacuum pump is a two blade or three blade root vacuum pump, or air cooling root vacuum pump.

9. The complete bearing-sealed root vacuum pump system capable of promoting vacuum ability of a condenser of a power plant as claimed in claim 1, wherein each root vacuum pump of the at least one root vacuum pump is connected to a cooling device for cooling water input to the root vacuum pump; the cooling device further comprises a stage cooling tubes so as to reduce temperatures of draining air and the root vacuum pump.

10. The complete bearing-sealed root vacuum pump system capable of promoting vacuum ability of a condenser of a power plant as claimed in claim 1, wherein the at least one root vacuum pump only includes one root vacuum pump, the inlet of the root vacuum pump is connected to the input end of the root vacuum pump set and the outlet of the root vacuum pump is connected to the output end of the root vacuum pump set.

11. The complete bearing-sealed root vacuum pump system capable of promoting vacuum ability of a condenser of a power plant as claimed in claim 1, wherein the at least one root vacuum pump is a plurality of root vacuum pumps; the root vacuum pumps are serially connected one by one; and the inlet of a last one of the plurality of root vacuum pumps is connected the output end of the root vacuum pump set;

and a transfer tube is connected between an inlet and an outlet of two adjacent root vacuum pumps.

* * * * *